June 27, 1961  M. SLOANE ET AL  2,989,752
PRESSURE SUIT HAVING AN AUTOMATIC VALVE
Filed April 29, 1960  2 Sheets-Sheet 1
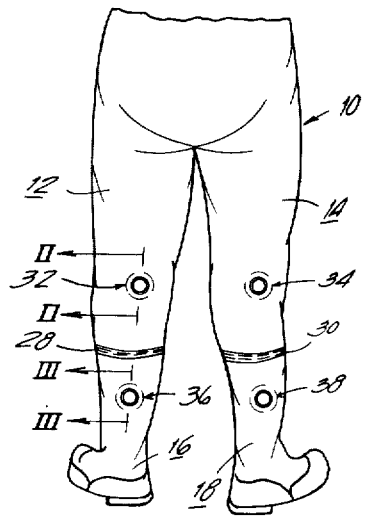
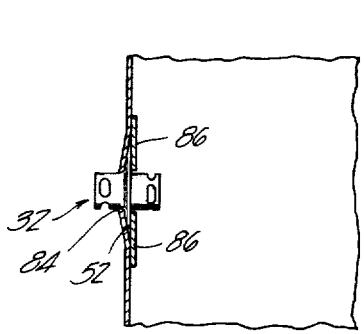
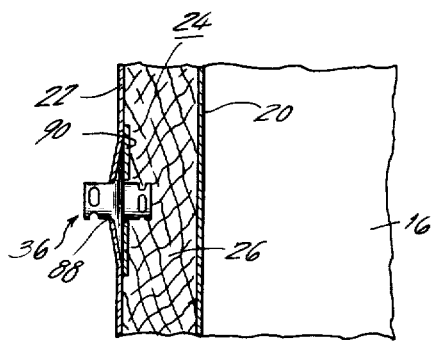
INVENTORS
Murray Sloane
BY Frank A. Catroppa
Arthur L. Collins
Robert T. Crawford
ATTORNEY

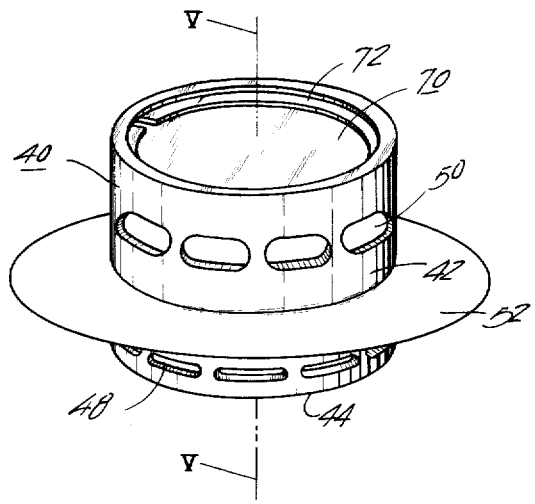
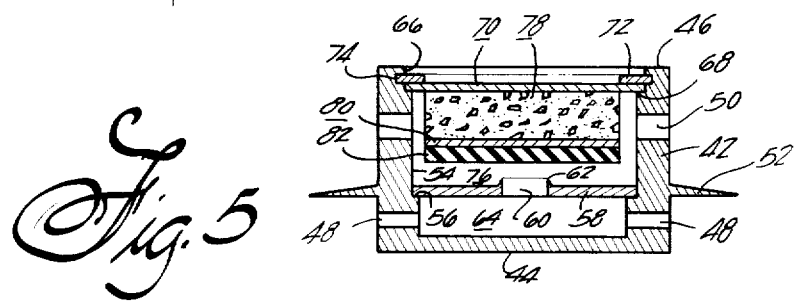
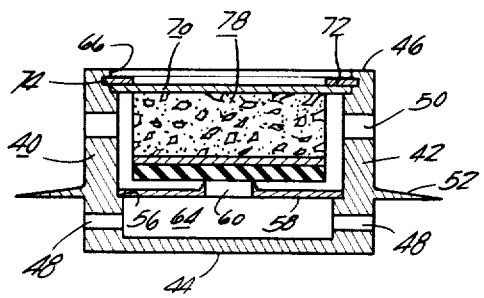
INVENTORS
Murray Sloane
Frank A. Catroppa
ATTORNEY

United States Patent Office 2,989,752
Patented June 27, 1961

2,989,752
PRESSURE SUIT HAVING AN AUTOMATIC VALVE
Murray Sloane, Camden, N.J., and Frank A. Catroppa, Philadelphia, Pa.
Filed Apr. 29, 1960, Ser. No. 25,805
2 Claims. (Cl. 2—2.1)
(Granted under Title 35, U.S. Code (1952), sec. 266)

The invention described herein may be manufactured and used by or for the Government of the United States of America for governmental purposes without the payment of any royalties thereon or therefor.

This invention relates to automatic valves and more particularly to liquid or water-responsive automatic closure or shut-off valves.

Valves constructed in accordance with the present invention are particularly well adapted for use in ventilated flying garments such as pressurized anti-exposure suits wherein the valves perform the dual function of controlling the exhaust of ventilation air from the anti-exposure suits during flight conditions and preventing the flow of water into the anti-exposure suits during emergency conditions when the suits become immersed in water. The valves can also be effectively utilized as an exhaust and automatic closure means in life vests, life rafts and air-insulated flight boots to exhaust or bleed-off the entrapped air in these articles which undergoes expansion at altitude. The exhaust of this expanded air is of critical importance inasmuch as it prevents the undesirable inflation or "ballooning" of the life rafts, life vests and flight boots during flight conditions. During emergency conditions, however, or more particularly when the life rafts, life vests and flight boots become immersed in water, the valves will automatically close and permit the air chambers in these articles to retain their necessary flotation characteristics.

In one specific embodiment of the invention, the valve is used environmentally with a ventilated anti-exposure suit and takes the form of a substantially cup-shaped housing having inlets and outlets therein intersected by a knife-edged valve seat. The cup-shaped housing is provided with an external annular flange thereon and is carried in a port or hole in the anti-exposure suit with the annular flange being attached to the anti-exposure suit to thereby secure the valve housing in a position of intended use. A liquid-responsive or water-responsive means in the form of a compressed cellulose sponge is carried in one end of the cup-shaped housing and the sponge in turn carries a valve disc or valve member. The size and more particularly the thickness of the sponge is selected so that, during "dry-state" thereof, there will be a predetermined clearance between the valve member and the valve seat or, expressed in another manner, so that the valve member will normally always be in the "open" position.

In operation, during flight conditions, the valve member of the valve will normally occupy a predetermined "open" position and will thus provide a substantially resistance-free exhaust port for the discharge of ventilation air from the anti-exposure suit. During emergency conditions, however, when the wearer of the anti-exposure suit finds it necessary to enter a body of water, the valve will become immersed and water will flow into the valve housing. Upon contact with the water, the sponge in its compressed state will expand almost instantaneously and move the valve member into engagement with the valve seat to thereby provide a positive fluid seal and prevent the flow of water into the anti-exposure suit.

Accordingly, one object of the present invention is to provide a valve defining a substantially resistance-free flow path for the exhaust of ventilation air from a ventilated flying garment or the like.

Another object of the present invention is to provide an automatic closure or shut-off valve for preventing the flow of water into a ventilated flying garment or the like.

Another object of the present invention is to provide a valve wherein the valve member thereof is actuated by a sponge.

Another object of the present invention is to provide an automatic closure or shut-off valve wherein the valve member thereof is substantially instantaneously moved to the "closed" position upon the entry of water into the housing of the valve.

Another object of the present invention is to provide a valve for exhausting or bleeding-off the entrapped air in the air chamber of an insulated flight boot or the like which undergoes expansion at altitude.

These and other objects of the present invention will become readily apparent to those skilled in the art from the following detailed description of a specific embodiment thereof taken in connection with the accompanying drawings, wherein:

FIG. 1 is an end elevation of an aviator's anti-exposure suit together with flight boots showing an environmental application of the valve of the present invention;

FIG. 2 is a section taken substantially along the line II—II of FIG. 1;

FIG. 3 is a section taken substantially along the line III—III of FIG. 1;

FIG. 4 is a perspective view of the specific embodiment of the valve;

FIG. 5 is a longitudinal section taken along the line V—V of FIG. 4 with the valve member of the valve being shown in the "open" position; and FIG. 6 is another longitudinal section similar to that shown in FIG. 5 with the valve member of the valve being shown in the "closed" position.

Referring more particularly to FIG. 1 together with FIGS. 2 and 3, there is shown the lower torso portion of an aviator's anti-exposure suit or the like 10 including leg portions 12 and 14 to which are attached or connected left and right boot members or boots 16 and 18, respectively. The anti-exposure suit 10, as is well known in the art, is preferably made of an impermeable rubberized fabric such as rubberized nylon or the like and in use is adapted to be supplied with ventilation air at a suitable pressure for the comfort and safety of the wearer (not shown). Boot members 16 and 18 are substantially identical in construction and in this specific instance are comprised of a double-walled structure (FIG. 3) including an inner wall 20 and an outer wall 22. Walls 20 and 22 define an air space or air chamber 24 therebetween, and the air in air chamber or air space 24 in function serves as an insulator or thermal barrier to protect the foot of the wearer of the boot. The air chamber 24 of each boot is filled with felt 26 to maintain a fixed or predetermined separation between the walls 20 and 22 thereof, although it will be appreciated that any other suitable soft and porous material capable of retaining air could be successfully employed. The boot members 16 and 18 are preferably made of rubber and, in this particular instance, the top portions thereof are connected or secured to the leg portions 12 and 14 of the suit by a suitable cement (not shown). The cemented connection between the boot members 16 and 18 and the leg portions 12 and 14 of the suit are covered by strips of tape or the like 28 and 30, and the strips of tape 28 and 30 are likewise secured to both the boot members 16 and 18 and the suit leg portions 12 and 14 by a suitable cement (not shown). In function, the strips of tape 28 and 30 together with the cemented connections between the boot members and the suit leg portions not only firmly attach or secure the boot members to the suit leg portions but also provide a fluid-seal or fluid-tight connection therebetween.

Ventilation air under pressure may be supplied to the suit 10 from any suitable source (not shown) and preferably is supplied by a conduit (not shown) connected to the head portion (not shown) of the suit. Ventilation air entering the head portion of the suit 10 is circulated over the body of the wearer and is exhausted from the lower portion of the suit through a suitable valve means, the valve means in this particular instance taking the form of a pair of identical exhaust valves 32 and 34 constructed in accordance with the present invention. Valves 32 and 34 are carried by the suit leg portions 12 and 14 adjacent the lower extremities thereof and are adapted to be rigidly secured to the suit leg portions 12 and 14 as will be discussed more in detail hereinafter. Another pair of valves 36 and 38, identical in construction to valves 32 and 34, are carried by the boot members 16 and 18 to exhaust or bleed-off the entrapped air in the air chambers 24 in the boot members when the entrapped air undergoes expansion at altitude. Valves 36 and 38 are likewise rigidly secured to the boot members 16 and 18, as will also be discussed more in detail hereinafter.

Referring now to FIGS. 4, 5 and 6, each of the valves hereinbefore mentioned takes the form in this specific embodiment of the invention of a substantially cup-shaped housing or casing 40 defined by a sidewall 42 and a bottom or end wall 44. The end of the housing or casing opposite bottom wall 44 is "open," and this "open" end of the casing is bound or defined by a top or end wall 46. Adjacent bottom wall 44, casing sidewall 42 is provided with inlet means therein, which in this specific embodiment of the invention takes the form of a plurality of spaced and circumferentially arranged passages 48 that communicate with the interior of casing 40. The inlet passages 48 extend substantially radially of the casing 40 and in this specific instance are substantially elliptical or oval-shaped in cross-section. Intermediate bottom wall 44 and top wall 46, casing 40 is also provided with outlet means therein, which in this specific embodiment of the invention likewise assumes the form of a plurality of spaced and circumferentially arranged passages 50 that also communicate with the interior of casing 40. The outlet passages 50 also extend substantially radially of the casing 40 and are substantially elliptical or oval-shaped in cross-section. The outlet passages 50 are substantially larger in cross-section than the inlet passages 48 and, in function, serve as an inlet means as well as an outlet means, as will be discussed more in detail hereinafter in connection with the operation of the valve of the present invention. It will also be noted that valve casing 40 is provided with an external peripheral flange or flange means 52 thereon which in this specific embodiment of the invention is integrally formed with casing sidewall 42. Flange 52 in use or function serves as a means to attach or secure the valve in a position of intended use, as will also be discussed more in detail hereinafter.

As best seen in FIGS. 5 and 6, the interior or inner wall of casing sidewall 42 is counterbored to a predetermined depth to define a peripheral inner wall portion 54 which terminates in an annular shoulder 56, the annular shoulder 56 in this instance being located within the interior of casing 40 at a predetermined distance from casing bottom wall 44 and lying on substantially the same radial or transverse plane as external peripheral flange 52. Annular shoulder 56 in function provides a seat for a disc means or disc member 58 which in turn is provided with a centrally disposed aperture or port 60 therein. Port 60 is bound or defined by an annular knife-edged projection 62 which in this specific instance functions at a knife-edged valve seat. Disc member 58 is rigidly secured in position within valve casing 40 and in this specific instance is preferably press-fitted firmly into engagement with casing inner peripheral wall 54 and the annular shoulder 56. With disc member 58 firmly seated on annular shoulder 56, the disc member 58 together with casing bottom wall 44 thus define a casing inlet chamber 64, which inlet chamber 64 communicates with the casing inlets 48. At the opposite or "open" end of casing 40, sidewall 42 is further counterbored or recessed to define another peripheral inner wall portion 66 which terminates in another annular shoulder 68.

A closure or closure means is carried in the "open" end of the casing 40 and in this specific embodiment of the invention takes the form of an annular plate or disc 70. Disc 70 is adapted to seat on annular shoulder 68 and is rigidly retained in position within the "open" end of the casing, or more particulary within counterbore 66, by a snap-ring 72 which in turn is adapted to be received within an annular recess 74 in casing sidewall 42. Disc 70 is dimensioned to snugly fit within counterbore 66 and when positioned therein combines with the disc member 58 to establish an outlet chamber 76 within the valve casing 40, the outlet chamber 76 communicating with the casing outlets 50.

A liquid-responsive or water-responsive actuator means or actuator of the expansible and contractable type is carried by the closure disc 70 and in this specific embodiment of the invention takes the form of a compressed cellulose sponge 78. An actuator made of any other natural or synthetic material which will expand upon contact with a liquid may be successfully employed in place of the compressed cellulose sponge 78, although a single, compressed cellulose sponge has been found to perform most satisfactorily. The single, compressed cellulose sponge 78 in this particular instance is substantially cylindrical in configuration and is dimensioned to have a predetermined cross-sectional area and a predetermined thickness. The sponge 78 is carried on the inner surface of closure disc 70 and is preferably attached or secured thereto by a suitable cement (not shown), although it will be appreciated that any other suitable type of securing means may be successfully employed. With the sponge 78 so carried by the closure disc 70, the sponge 78 will thus be positioned in the casing outlet chamber 76 with the peripheral surface of the sponge being located in close proximity to the casing outlets 50.

A valve member means or valve member 80 is carried by the compressed cellulose sponge 78 and in this specific embodiment of the invention takes the form of an annular plate or disc 82. The valve member 80 is substantially identical in cross-sectional area to the cross-sectional area of the sponge 78 and is carried by the sponge 78 on the free or unattached end thereof. The valve member 80 is rigidly secured to the sponge 78 and is preferably secured thereto by a suitable cement (not shown), although it will be apparent that any other suitable type of securing means may be successfully employed. Being thus carried on the free end of the sponge 78, it will be apparent that the valve member 80 will thus be moveable by the sponge, upon the expansion and contraction thereof, between "open" and "closed" positions relative to the knife-edged valve seat 62. Valve member 80 carries a seal means in the form of a rubber disc or washer 82 on the face thereof opposite the valve seat 62, and the seal means in function, as is also well known in the art, is adapted to afford a fluid-tight sealing engagement between the valve member 80 and the valve seat 62. The washer 82 in this specific instance is substantially identical in cross-sectional area to the cross-sectional area of the valve member 80 and is preferably secured to the valve member 80 by a suitable cement (not shown).

Valves 32 and 34 and valves 36 and 38 are secured in positions of intended use as best shown in FIGS. 2 and 3. Referring first to FIG. 2, the housing 40 of the valve 32 of the present invention is carried in an aperture or port 84 in the leg portion 12 of the suit 10 in such a manner that the casing outlet passages 50 are positioned externally of the suit and the casing inlet passages 48 are positioned internally or in the interior of the suit. With the valve casing 40 being so positioned in port 84, one side of casing flange 52 (the side facing outlet ports 50) is rigidly secured to the inner peripheral surface of the suit surrounding port 84 by a suitable cement (not shown). An apertured disc or washer 86 is carried on the reverse side of casing flange 52 and this apertured disc or washer 86 is also secured by a suitable cement (not shown) to both the reverse side of the flange 52 and the inner peripheral surface of the suit. The apertured disc 86 is preferably made of the same material utilized in the construction of suit 10, and the presence or use of the apertured disc 86 provides a means of securing both sides of the casing flange 52 to the inner peripheral surface of the suit and thus enhances the rigidity of the bond between the casing flange 52 and the suit. As seen in FIG. 3, the valve 36 is secured to the boot 16 with a bonding or cementing arrangement identical to that shown in FIG. 2. The casing 40 of valve member 36 is carried in an aperture or port 88 in outer wall 22 of boot 16 in such a manner that the outlet passages 50 in the valve casing 40 are positioned externally of the boot and the casing inlet passages 48 are positioned internally or in the interior of air chamber 24 in the boot. With the valve casing 40 so positioned, one side of casing flange 52 is cemented to the inner peripheral surface of boot outer wall 22, and the opposite side of the flange 52 is cemented to an apertured disc 90 which in turn is also cemented to the inner peripheral surface of boot outer wall 22.

The operation of the valve of the present invention can best be explained by reference to FIGS. 1, 5 and 6. When the anti-exposure suit 10 and boots 16 and 18 are worn by an aviator under flying conditions, the components of all four of the valves 32, 34, 36 and 38 will normally assume the positions shown in FIG. 5. The compressed cellulose sponge 78 in each valve will be in a substantially "dry-state" and will hold the valve member 80 in a normally "open" predetermined position with reference to the valve seat 62 to thus establish a predetermined clearance between the valve member and the valve seat being determined for the most part by the predetermined thickness of the sponge. Ventilation air supplied under pressure to the interior of suit 10 will be circulated over the body of the wearer and will be exhausted through valves 32 and 34, the ventilation air entering each valve through inlet passages 48 therein and being exhausted through outlet passages 50. Inasmuch as the valve member 80 of the two valves 32 and 34 will be held in a normally "open" predetermined position, the valves 32 and 34 will thus establish a substantially resistance-free flow path for the exhaust of ventilation air from the suit and will thus avoid the imposition of a "back pressure" on the ventilation air source (usually a compressor). Similarly, with the valve member 80 of the boot valves 36 and 38 in a normally "open" predetermined position, the entrapped air in air chambers 24 in the boots will be exhausted through the valves when the entrapped air undergoes expansion at altitude. The exhaust of this entrapped air from the air chambers 24 in the boots will prevent the inflation or "ballooning" of the boots at altitudes above ground elevation and will thus eliminate a flying hazard and a source of discomfort for the aviator or the wearer of the boot.

In the event it becomes necessary for the aviator to abandon the aircraft being flown and enter a body of water or the like, the suit 10 and the boots 16 and 18 together with the valves 32, 34, 36 and 38 will of course become immersed in water. In this situation, the water will immediately flow into the outlet chambers 76 of each valve through casing outlet passages 50 and come into contact with the compressed sponge 78 therein. Since the casing outlet passages 50 in each valve have a sufficiently large cross-section to quickly admit a relatively large quantity of water into outlet chambers 76 and since the peripheral surface of the sponge 78 in each valve is located in close proximity to the casing outlet passages 50, the compressed sponge 78 in each valve will immediately become saturated with water and will expand substantially instantaneously to thereby move the valve member 80 in each valve into tight sealing engagement with the valve seat 62. With the valve members 80 of all four valves 32, 34, 36 and 38 being seated or in the "closed" position, the valves will thus prevent the entry of water into the suit 10 and the air chambers 24 in boots 16 and 18.

Obviously many modifications and variations of the present invention are possible in the light of the above teachings. It is therefore to be understood that within the scope of the appended claims, the invention may be practiced otherwise than as specifically shown and described.

What is claimed is:

1. A device for permitting the exhausting of a gas from, while preventing the flow of liquid into, a flying suit comprising a housing open at one end and closed at its opposite end having an inlet and an outlet, a flange secured to the outer surface of said housing intermediate said inlet and outlet adapted for securing said housing to said suit, a wall disposed within said housing intermediate said inlet and outlet and having a port with a surrounding lip defining a valve seat directed toward said open end, a closure removably disposed in said open end of said housing, retaining means securing said closure in position, a compressed sponge secured to the inner side of said closure and having valve means adapted to seat on said lip said sponge having a size when dry which will permit the passage of gas from said inlet and outlet by way of said port and being adapted to expand with being wetted to a size which will cause said valve means to seat on said lip and close said port.

2. The device of claim 1 wherein said compressed sponge is compressed cellulose.

References Cited in the file of this patent

UNITED STATES PATENTS

| | | |
|---|---|---|
| 2,362,240 | Bonilla | Nov. 7, 1944 |
| 2,404,020 | Akerman | July 16, 1946 |
| 2,569,451 | Browne | Oct. 2, 1951 |
| 2,633,131 | Grosvenor | Mar. 31, 1953 |
| 2,801,644 | Laswell | Aug. 6, 1957 |